Dec. 20, 1955  R. W. CONBOY  2,727,722
CONDUIT CATERPILLAR
Filed Oct. 17, 1952  3 Sheets-Sheet 1
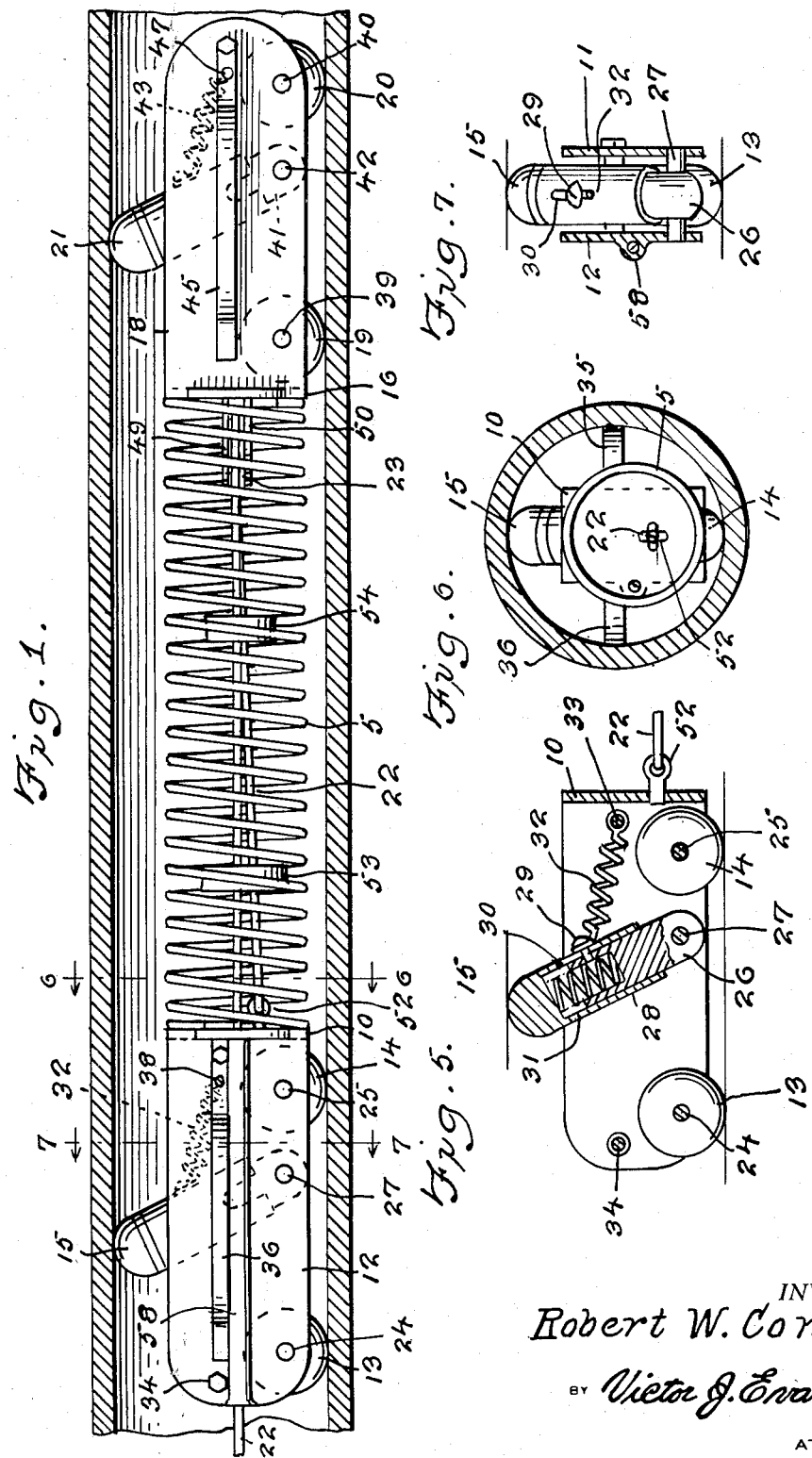
INVENTOR.
Robert W. Conboy
BY Victor J. Evans & Co.
ATTORNEYS Dec. 20, 1955     R. W. CONBOY     2,727,722
CONDUIT CATERPILLAR
Filed Oct. 17, 1952     3 Sheets-Sheet 2
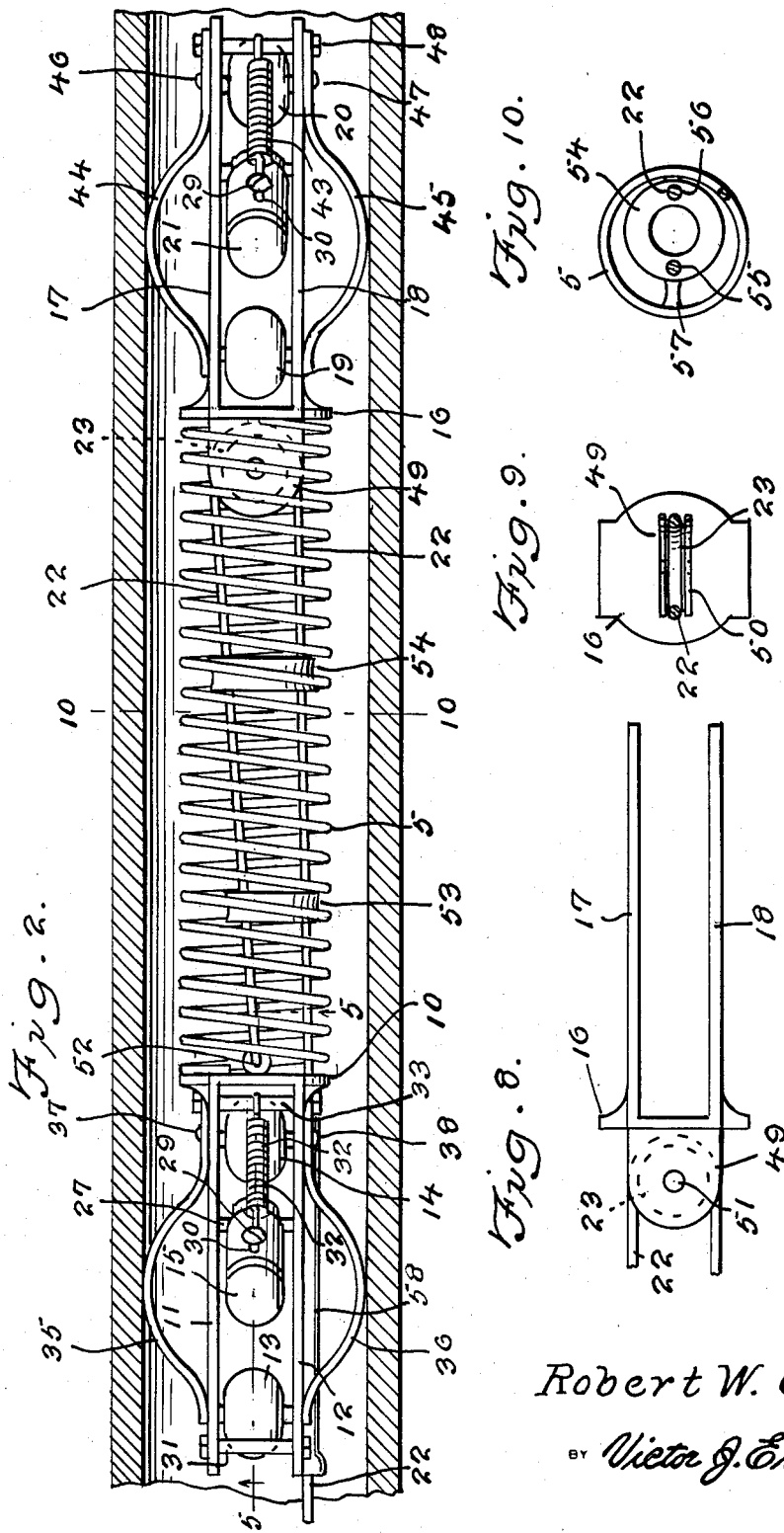
INVENTOR.
Robert W. Conboy
BY Victor J. Evans & Co.
ATTORNEYS

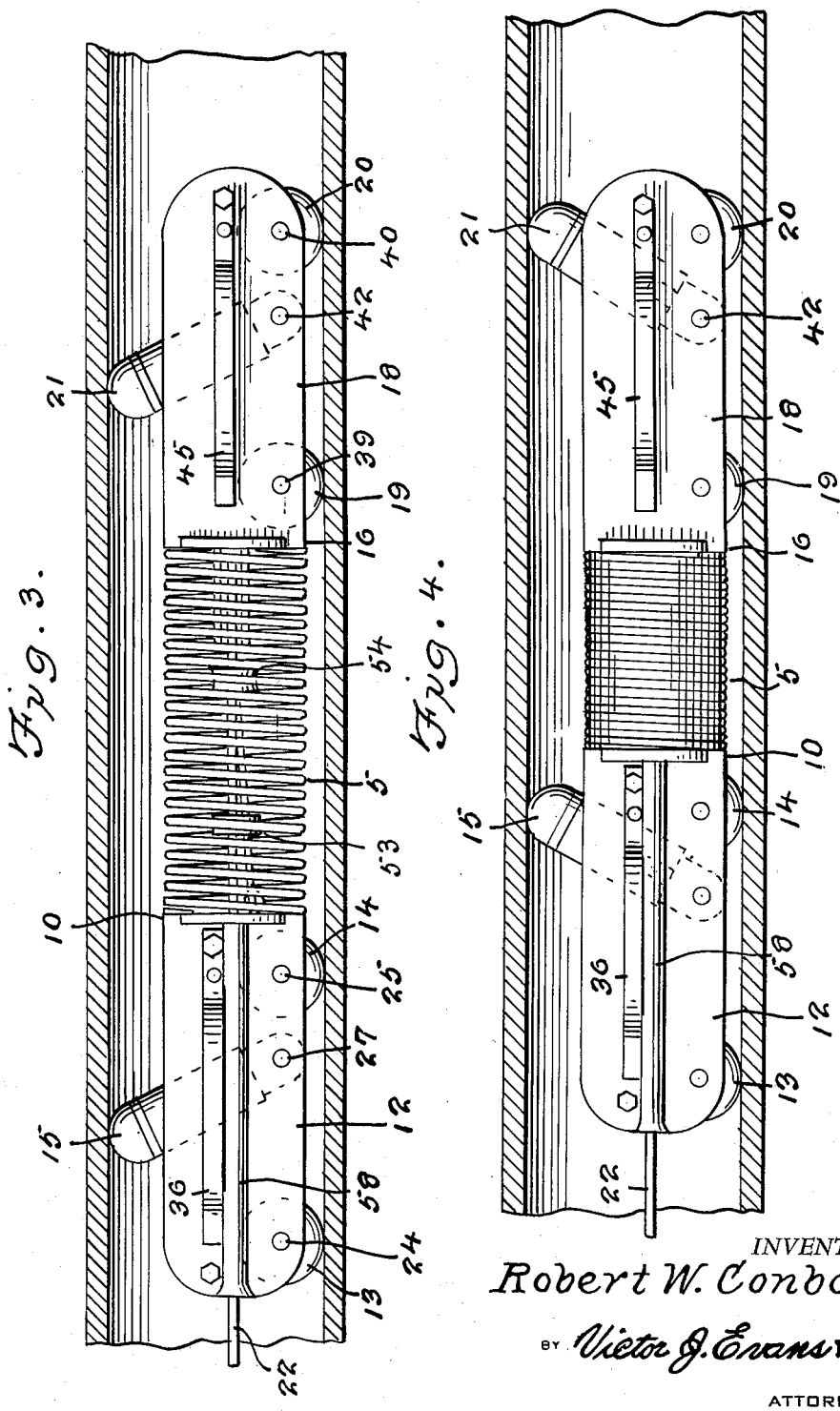

United States Patent Office 2,727,722
Patented Dec. 20, 1955

2,727,722

CONDUIT CATERPILLAR

Robert W. Conboy, Phoenix, Ariz.

Application October 17, 1952, Serial No. 315,401

5 Claims. (Cl. 254—134.6)

This invention relates to mechanical devices for carrying wire, cables, and the like through conduits particularly for electrical installations and in particular, a pair of units each having a gripping dog thereon with a spring for urging a leading unit from a following unit and with a cable extended through and attached to the following unit and trained over a pulley carried by the leading unit, whereby force applied to the cable draws the following unit toward the leading unit and when the force is released and the following unit held in position by a dog therein the spring urges the leading unit forwardly.

The purpose of this invention is to provide a mechanically actuated device for carrying a cable or the like through a conduit.

In the conventional manner of carrying electric wires through conduits a comparatively stiff wire is fed through and after this has reached the opposite end the comparatively soft wire is attached thereto and drawn through the conduit. In other instances a pilot wire is inserted in the conduit as the conduit is built or installed and when it is desired to install the service wire it is pulled through the conduit by the pilot wire. In some cases the pilot wire has been found to rust and break before the service wire is installed. With these and other conventional methods in use it is difficult, if not impossible to run service wires through conduits particularly where the conduit contains water or is formed with several bends. With this thought in mind this invention contemplates a mechanical device that substantially crawls through a conduit whereby conduits may be installed without pilot wires and when it is desired to run a service wire through the conduit it is only necessary to send the mechanical device of this invention through the conduit with the wire attached thereto.

The object of this invention is, therefore, to provide means for forming a mechanically actuated device which, when actuated by the wire extended therefrom moves forwardly with each pull on the wire so that with a cable attached to the device the cable will be drawn through a conduit regardless of the length of the conduit.

Another object of the invention is to provide a mechanical device for carrying wire through conduits that is adapted to be used for carrying wire through conduits now installed.

A further object of the invention is to provide a mechanical device for carrying wires through conduits in which the device is of a simple and economical construction.

With these and other objects and advantages in view the invention embodies a pair of travelers each having a pair of rollers extended from one side with a pivotally mounted spring actuated gripping dog extended from the other, a spring positioned between the travelers and a cable extended through the following traveler, trained over a pulley on the trailing end of the leading traveler and secured to the forward end of the following traveler.

Other features and advantages of the invention will appear from the following description taken in connection with the drawings, wherein:

Figure 1 is a side elevational view illustrating the complete device and showing the device incorporated in a conduit, the conduit being shown in section.

Figure 2 is a plan view of the complete device as shown in Fig. 1 also showing the device in a conduit and showing the conduit in section.

Figure 3 is a side elevational view similar to that shown in Fig. 1 showing the following traveler drawn toward the leading traveler by a cable extended through the following traveler, trained over a pulley on the leading traveler, and attached to the forward end of the following traveler.

Figure 4 is a similar view showing the spring completely compressed wherein the distance between the travelers is reduced to a minimum.

Figure 5 is a longitudinal section through the following traveler with the spring and leading traveler omitted.

Figure 6 is a cross section through the conduit taken on line 6—6 of Fig. 1 showing the following traveler.

Figure 7 is a cross section through the following traveler with the conduit omitted, being taken on line 7—7 of Fig. 1.

Figure 8 is a plan view of the leading traveler illustrating the frame thereof with other parts omitted.

Figure 9 is a rear elevational view of the leading traveler showing the pulley on the trailing end thereof.

Figure 10 is a cross section through the spring positioned between the travelers and illustrating a cable guide for retaining the cable in position in the spring.

Referring now to the drawings wherein like reference characters denote corresponding parts of the improved mechanical device for drawing cables through conduits of this invention includes a following traveler having a head 10 with side plates 11 and 12 between which wheels 13 and 14 are journaled and a dog 15 is pivotally mounted, a leading traveler having a head 16 with side plates 17 and 18 between which wheels 19 and 20 are journaled and a dog 21 is pivotally mounted, a spring 5 for urging the travelers apart, and a cable 22 which extends through the following traveler and is trained over a pulley 23 of the leading traveler.

The rollers or wheels 13 and 14 of the following traveler are formed with arcuate surfaces as illustrated in Fig. 7 whereby the rollers engage the inner surface of the conduit or the like. These rollers are journaled on shafts 24 and 25, respectively, in the side plates 11 and 12 and the rollers are positioned whereby they extend beyond the edges of the side plates sufficiently to engage the inner surface of a conduit in which the device is positioned.

The base 26 of the dog 15 is pivotally mounted on a pin 27 which also extends through the side plates 11 and 12 and the cap of the dog, which is provided with a tubular section 28 is slidably mounted over the base and secured thereto by a stud 29 which extends through a slot 30 in the cap and which is threaded into the base. A spring 31 is positioned between the cap and base for urging the cap outwardly. The dog is urged forwardly by a spring 32, one end of which is secured to the stud 29 and the other to a pin 33 that is mounted in the side plates 11 and 12 of the traveler. The outer ends of the side plates of the traveler are secured in spaced relation with the bolt 34.

Outwardly bowed springs 35 and 36 are mounted by bolts 37 and 38, respectively, on the outer surfaces of the side plates 11 and 12. These springs are positioned to engage the inner surface of the conduit whereby the traveling devices are retained in centrally disposed positions.

The leading traveler having the head 16 is similar to the traveler having the head 10 and the rollers or wheels 19 and 20 thereof are rotatably mounted on shafts 39 and 40 and the base 41 of the dog 21 is pivotally mounted on a pin 42 that extends through the side plates 17 and 18. The dog 21 is also held by a spring 43, similar to the spring 32 and the side plates are provided with centering springs 44 and 45 that are secured to the outer surfaces of the side plates 17 and 18 with bolts 46 and 47, respectively. The extended ends of the side plates 17 and 18 are held by a bolt 48, similar to the bolt 34. The dog 21 is also provided with a spring, similar to the spring 31 and the cap is slidably mounted on the base, as shown.

The head 16 of the leading traveler is provided with extended flanges 49 and 50 between which the pulley 23 is rotatably mounted by the pin 51, as shown in Figs. 8 and 9.

With the parts formed in this manner the cable 22 extends through a channel 58 on the side plate 12 of the following traveler, from which it extends forwardly and is trained over the pulley 23 and from the pulley 23 the cable extends back to the following traveler and is attached to an eye 52 on the head 10 of the following traveler.

Cable centering guides 53 and 54, as illustrated in Fig. 10 are provided in the spring and these guides are in the form of rings with cable openings 55 and 56 therethrough and the rings are supported by arms 57 from the coils of the spring.

With the parts formed in this manner the unit is started into the end of a conduit and the like and with the dogs 15 and 21 positioned as illustrated in Fig. 1 the cable 22 is drawn rearwardly whereby the dog 21 coacting with the rollers 19 and 20 retains the leading traveler in position wherein the cable traveling over the pulley 23 and secured to the following traveler draws the following traveler forwardly to the position shown in Fig. 3 and upon release of the cable the action of the spring 2 sets the dog 15 in gripping relation with the rollers 13 and 14 whereby the leading traveler moves forwardly from the position shown in Fig. 3 to that shown in Fig. 1. As the leading traveler reaches a forwardly extended position the force is again applied to the cable 22 whereby the following traveler is again drawn forwardly and as the following traveler reaches the position shown in Fig. 3 the spring 5 again drives the leading traveler forwardly whereby the cycle of operation is continued.

With the connection between the leading and following travelers flexible such as with the spring 5 the device is adapted to travel around comparatively short corners or bends in pipes, tubing, or other conduits and with an electric wire or cable attached to the device the cable will be mechanically drawn through a conduit or the like.

This conduit carrying device is, therefore, adapted to draw a cable or the like through a tube or pipe of substantially any installation and should the device meet an obstruction that definitely blocks its passage it may be recovered by pulling on the cable 22 until the spring 5 is compressed, and then exert more force on the cable to compress springs 31 in the dogs. By compressing the springs 31 the length of the dogs is reduced whereby they pass over the center and are held by the springs 32 and 43, as shown in Figure 4 whereby the travelers are adapted to be withdrawn from the conduit.

It will be understood that modifications, within the scope of the appended claims, may be made in the design and arrangement of the parts without departing from the spirit of the invention.

What is claimed is:

1. A cable carrier comprising a leading traveler, a following traveler, and a spring positioned between the travelers and aligned with the axes thereof, a dog having a yielding element therein pivotally mounted in each of the travelers for clamping the travelers in position in a conduit or the like, the length of said dog, in the extended position being greater than the distance from the pivotal mounting thereof to the opposed inner surface of the wall of a conduit in which the device is positioned, wheels journaled in the travelers and extended from one of the edges thereof, and a cable extended through one traveler, over a pulley on the other traveler and back to the traveler through which the cable extends, and to which the end of the cable is attached.

2. A cable carrier comprising a leading traveler, a following traveler, and a spring positioned between the travelers and aligned with the axes thereof, securing means for clamping the travelers in position in a conduit or the like, wheels journaled in the travelers and extended from one of the edges thereof, a cable extended through one traveler, over a pulley on the other traveler and back to the traveler through which the cable extends, and to which the end of the cable is attached and said securing means including dogs pivotally mounted in the travelers and extended from the edges thereof opposite to the edges from which the wheels extend.

3. In a cable carrier, the combination which comprises a following traveler including spaced side plates extended from a head, wheels journaled in the side plates and extended from one of the edges thereof, a dog pivotally mounted between said side plates of the traveler and extended from the edge thereof opposite to the edge from which the wheels extend, a leading traveler also having spaced side plates extended from a head with wheels journaled in the side plates and extended from one edge of the traveler and a dog also pivotally mounted between the side plates and extended from the edge of the traveler opposite to the end from which the wheels extend, a spring between the travelers and positioned to urge one traveler from the other with the travelers and spring in alignment, and a pulley journaled on the leading traveler whereby with a cable attached to the following traveler, trained over said pulley and extended through the following traveler the following traveler is drawn toward the leading traveler by a force applied to said cable.

4. In a cable carrier, the combination which comprises a following traveler including spaced side plates extended from a head, wheels journaled in the side plates and extended from one of the edges thereof, a dog pivotally mounted between said side plates of the traveler and extended from the edge thereof opposite to the edge from which the wheels extend, a leading traveler also having spaced side plates extended from a head with wheels journaled in the side plates and extended from one edge of the traveler and a dog also pivotally mounted between the side plates and extended from the edge of the traveler opposite to the end from which the wheels extend, a spring between the travelers and positioned to urge one traveler from the other with the travelers and spring in alignment, a pulley journaled on the leading traveler whereby with a cable attached to the following traveler, trained over said pulley and extended through the following traveler the following traveler is drawn toward the leading traveler by a force applied to said cable and resilient means for urging the dogs forwardly.

5. In a cable carrier, the combination which comprises a following traveler including spaced side plates extended from a head, wheels journaled in the side plates and extended from one of the edges thereof, a dog pivotally mounted between said side plates of the traveler and extended from the edge thereof opposite to the edge from which the wheels extend, a leading traveler also having spaced side plates extended from a head with wheels journaled in the side plates and extended from one edge of the traveler and a dog also pivotally mounted between the side plates and extended from the edge of the traveler opposite to the end from which the wheels extend, a spring between the travelers and positioned to urge one traveler from the other with the travelers and spring in alignment, a pulley journaled on the leading traveler whereby with a cable attached to the following traveler, trained over said pulley and extended through the following traveler the following traveler is drawn toward the leading traveler by a force applied to said cable, resilient means for urging the dogs forwardly and resilient means for centering the travelers in a conduit.

References Cited in the file of this patent

UNITED STATES PATENTS

| | | |
|---|---|---|
| 873,996 | De Voe | Dec. 17, 1907 |
| 880,677 | Mars | Mar. 3, 1908 |
| 901,159 | Dieter et al. | Oct. 13, 1908 |

FOREIGN PATENTS

| | | |
|---|---|---|
| 611,558 | Germany | Mar. 30, 1935 |